United States Patent
Haynes

(10) Patent No.: US 9,714,861 B2
(45) Date of Patent: Jul. 25, 2017

(54) ADJUSTABLE SHUNT REGULATED AND SWITCHING POWER SUPPLY FOR LOOP POWERED TRANSMITTER

(71) Applicant: Magnetrol International, Incorporated, Downers Grove, IL (US)

(72) Inventor: Kevin M. Haynes, Lombard, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 1056 days.

(21) Appl. No.: 13/653,462

(22) Filed: Oct. 17, 2012

(65) Prior Publication Data

US 2014/0107856 A1   Apr. 17, 2014

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05F 1/00 | (2006.01) |
| G01F 23/284 | (2006.01) |
| G01S 13/02 | (2006.01) |

(52) U.S. Cl.
CPC ........ *G01F 23/284* (2013.01); *G01S 13/0209* (2013.01)

(58) Field of Classification Search
CPC ..... G06F 1/26; G05F 1/00; G05F 1/40; G05F 1/56; G05F 1/61; G05F 3/08; G05B 24/02; G08C 19/02; G08C 19/00; G01S 13/02; G01S 7/02; G01F 23/28
USPC ....... 375/25; 340/12, 31, 87; 323/22, 27, 28, 323/31; 327/53, 54; 363/28, 62; 307/10
See application file for complete search history.

(56) References Cited

U.S. PATENT DOCUMENTS

| | | | |
|---|---|---|---|
| 7,271,646 B2 | 9/2007 | Flasza | |
| 2004/0061537 A1* | 4/2004 | Flasza | 327/157 |
| 2007/0152645 A1* | 7/2007 | Orth | 323/275 |
| 2009/0224730 A1* | 9/2009 | Schulte | 323/220 |
| 2011/0001435 A1* | 1/2011 | Wray | 315/291 |

* cited by examiner

Primary Examiner — Mohammad Ali
Assistant Examiner — Md Azad
(74) Attorney, Agent, or Firm — Wood, Phillips, Katz, Clark & Mortimer

(57) ABSTRACT

A loop powered process instrument comprises a control system measuring a process variable and developing a measurement signal representing the process variable. An output circuit, for connection to a remote power source using a two-wire process loop, controls current on the loop in accordance with the measurement signal. A power supply is connected to the output circuit and the control system. The power supply receives power from the two wire process loop and supplies power to the control system. The power supply comprises a voltage regulator receiving loop power and developing a regulated output voltage and an adjustable shunt regulator controlling voltage supplied to the voltage regulator.

20 Claims, 4 Drawing Sheets

ADJUSTABLE SHUNT REGULATED AND SWITCHING POWER SUPPLY FOR LOOP POWERED TRANSMITTER

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to a two-wire, loop powered instrument with an adjustable shunt regulated switching power supply.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

An electrical transmitter must be connected to an electrical power source to operate. One form of such a transmitter, known as a four-wire transmitter, includes two terminals for connection to a power source and two terminals for carrying an output signal proportional to the process variable. This signal can be used as an input to a controller or for purposes of indication. Because the instrument is connected directly to a power source independent from the output signal, power consumption is a less critical factor in design and use of the same.

The use of a four-wire transmitter, as discussed above, requires the use of four conductors between the transmitter and related loop control and power components. Where transmitters are remotely located, such a requirement can be undesirable owing to the significant cost of cabling. To avoid this problem, instrument manufacturers have strived to develop devices known as two-wire, or loop powered, transmitters. A two-wire transmitter includes two terminals connected to a remote power supply. The transmitter loop current, drawn from the power supply, is proportional to the process variable. A typical instrument operates off of a 24 volt DC power supply and varies the signal current in the loop between four and twenty milliamps (mA) DC. Thus, the instrument must operate with current less than four milliamps.

While low power circuits are continuously developed, there are other increasing demands placed on performance capabilities of the process control instruments. For example, with a guided wave radar level measurement device, the instrument's performance is enhanced by more powerful digital signal processing techniques driven by a microprocessor. In addition to the microprocessor, there are several other circuits, such as the radar transceiver, which requires electric power. To be successful, the instrument must use optimum processing capability and speed. This means making maximum power from the loop available to the electronics, and using it efficiently.

More recently, the loop powered instruments have utilized digital communications. In normal operation, the instrument must allow for 4 mA to 20 mA loop currents while still communicating digital signals via modulation of the loop current. Loop currents as low as 3.6 mA or as high as 22 mA are allowed when the transmitter detects a fault condition. This means that the power available at the input to the switching power supply, which powers the entire transmitter, will be based on input voltage to the switching power supply and the nominal loop current. However, the actual power available will also be based on the efficiency of the switching power supply. In addition, it is necessary to maintain high input impedance for digital communications.

The present invention is directed to solving one or more of the problems discussed above in a novel and simple manner.

SUMMARY

In accordance with the invention, a switching power supply for a loop power transmitter utilizes an adjustable shunt regulator.

There is disclosed herein a loop powered process instrument comprising a control system measuring a process variable and developing a measurement signal representing the process variable. An output circuit, for connection to a remote power source using a two-wire process loop, controls current on the loop in accordance with the measurement signal. A power supply is connected to the output circuit and the control system. The power supply receives power from the two wire process loop and supplies power to the control system. The power supply comprises a voltage regulator receiving loop power and developing a regulated output voltage and an adjustable shunt regulator controlling voltage supplied to the voltage regulator.

There is also disclosed herein a two-wire transmitter comprising a signal processing circuit measuring a process variable and developing a measurement signal representing the process variable. A control system includes an output circuit for connection to a remote power source using a two-wire process loop. The control system controls current on the loop in accordance with the measurement signal. A power supply is connected to the output circuit and the control system for receiving power from the two wire process loop and supplying power to the control system. The power supply comprises a switching regulator receiving loop power and developing a regulated output voltage. An adjustable shunt regulator controls voltage supplied to the voltage regulator.

It is a feature that the adjustable shunt regulator is controlled by the control system.

It is another feature that the adjustable shunt regulator is controlled to insure high input impedance to the instrument.

It is a further feature that the adjustable shunt regulator is controlled to increase voltage supply to the voltage regulator as loop current decreases and is controlled to decrease voltage supplied to the voltage regulator as loop current increases.

It is yet another feature that the control system adjusts a resistor ratio that feeds voltage supplied to the voltage regulator. The control system may adjust the resistor ratio in discrete steps as by selectively coupling resistors of a resistor divider circuit to the adjustable shunt regulator. The control system may adjust the resistor ratio using a potentiometer.

It is an additional feature that the control system adjusts the resistor ratio using a digital potentiometer.

It is yet another feature that the control system comprises a programmed processor.

Other features and advantages will be apparent from a review of the entire specification, including the appended claims and drawings.

DETAILED DESCRIPTION

Figure 1:
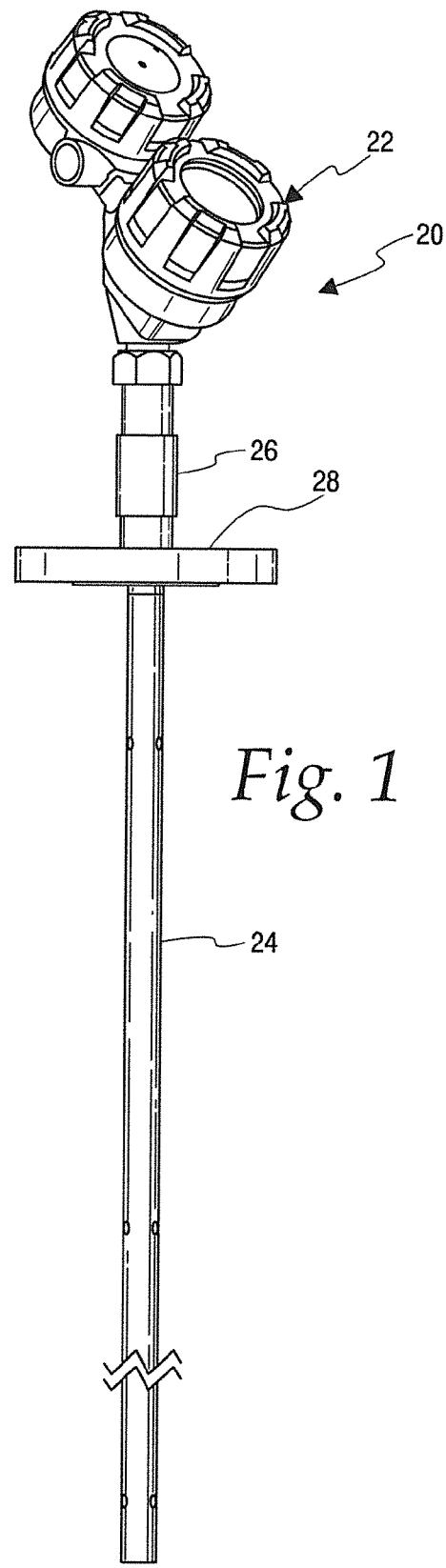
FIG. 1 is an elevation view of a two-wire transmitter with an adjustable shunt regulated switching power supply.

Referring to FIG. 1, a process instrument 20 is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar (GWR) for sensing level. While the embodiment described herein relates to a guided wave radar level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is mounted to a process vessel (not shown) using a flange 28. The housing 22 is then secured to the probe 24 as by threading the connector 26 to the probe 24 and also to the housing 22. The probe 24 comprises a high frequency transmission line which, when placed in a fluid, can be used to measure level of the fluid. Particularly, the probe 24 is controlled by a controller, described below, in the housing 22 for determining level in the vessel.

As described more particularly below, the controller in the housing 22 generates and transmits pulses on the probe 24. A reflected signal is developed off any impedance changes, such as the liquid surface of the material being measured. A small amount of energy may continue down the probe 24.

Guided wave radar combines TDR, ETS and low power circuitry. TDR uses pulses of electromagnetic (EM) energy to measure distanced or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. Then the EM pulse is sent down the probe it meets the dielectric discontinuity, a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately eight scans are taken per second.

Figure 2:
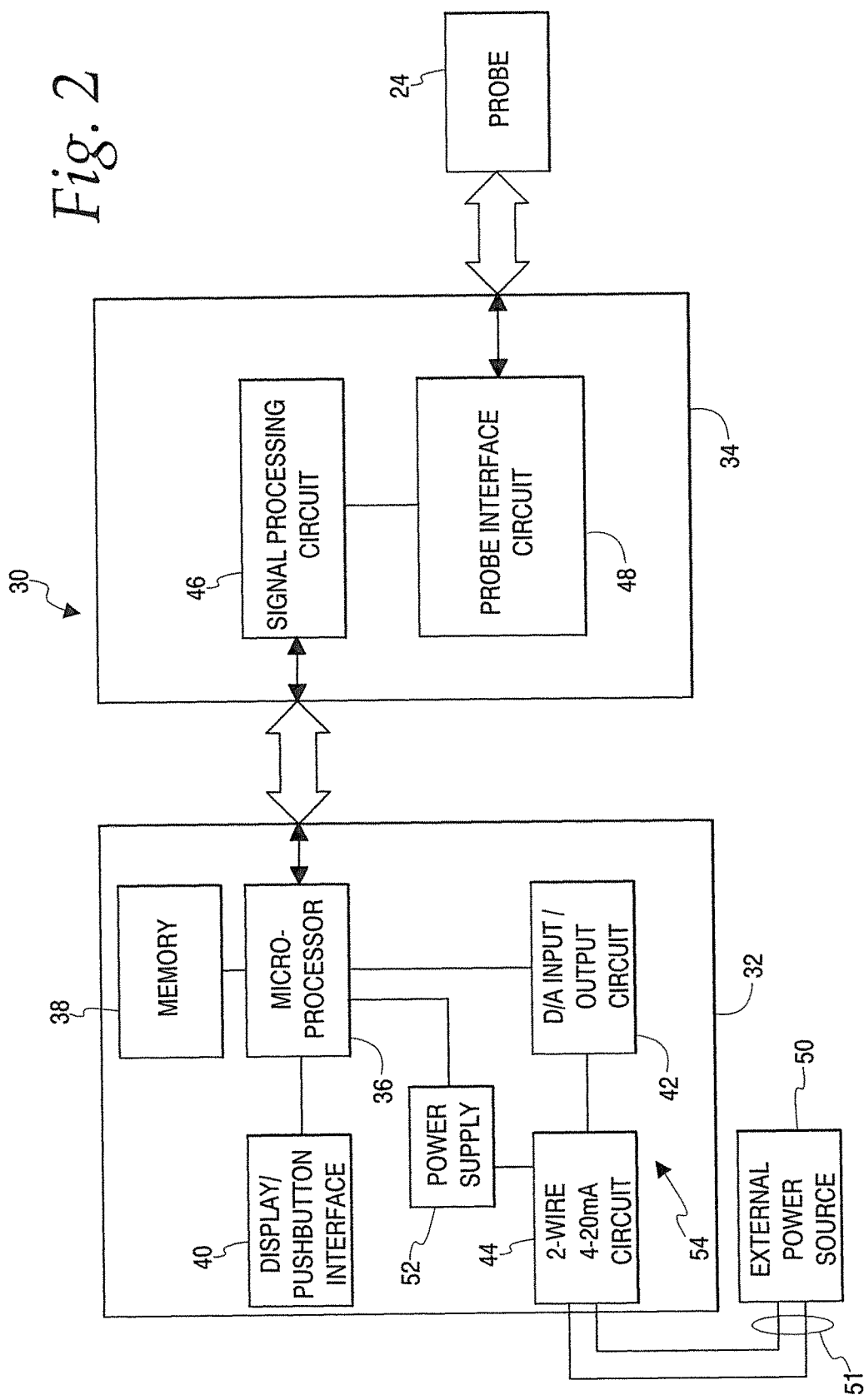
FIG. 2 is a block diagram of the transmitter of FIG. 1.

Referring to FIG. 2, the electronics mounted in the housing 22 of FIG. 1 are illustrated in block diagram form as a controller 30 connected to the probe 24. The controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote and external power source 50 over a loop 51. A power supply circuit 52 is connected to the two-wire circuit 44 and regulates power supplied to the microprocessor 36, as well as all other circuitry of the controller 30.

The two-wire circuit 44 utilizes loop control which is well known and commonly used in process instrumentation. The power is provided from the remote power source 50. The power source 50 may be, for example, a 24 volt dc supply. The two-wire circuit 44 controls the current on the two-wire loop 51 in the range of 4-20 mA which represents level or other characteristics measured by the probe 24.

The controller 30 may have the capability of implementing digital communications through the two-wire circuit 44 with remote devices and the outside world. Such communication preferably uses the HART protocol, but could also use fieldbus protocols such as Foundation Fieldbus or Profibus PA.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 44 processes the ETS signals and provides a timed output to the microprocessor 36, as described more particularly below.

The general concept implemented by the ETS circuit is known. The probe interface circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, target, level, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances.

In accordance with the invention, the digital circuit 32 defines a control system 54 for controlling operation of the instrument 20 to measure level using the programmed processor 36. As described more particularly below, the control system 54 includes the feature of the microprocessor 36 controlling the power supply 52.

The power supply 52 uses an adjustable shunt regulator that controls voltage supplied to a switching regulator. The switching regulator is very efficient in converting power from a higher voltage at its input to a lower, regulated voltage for the balance of the transmitter circuits. The shunt regulator helps to assure high input impedance to the transmitter which is important for digital communications. Allowing as low a shunt voltage as possible makes the transmitter tolerant of a lower power supply or increased loop resistance.

While the power supply is described herein in connection with a GWR level measurement instrument, the power supply can be used with virtually any type of loop powered, two-wire instrument. As will be apparent, the reference to GWR technology herein is not intended to be limiting, but rather shows an exemplary embodiment.

Figure 3:
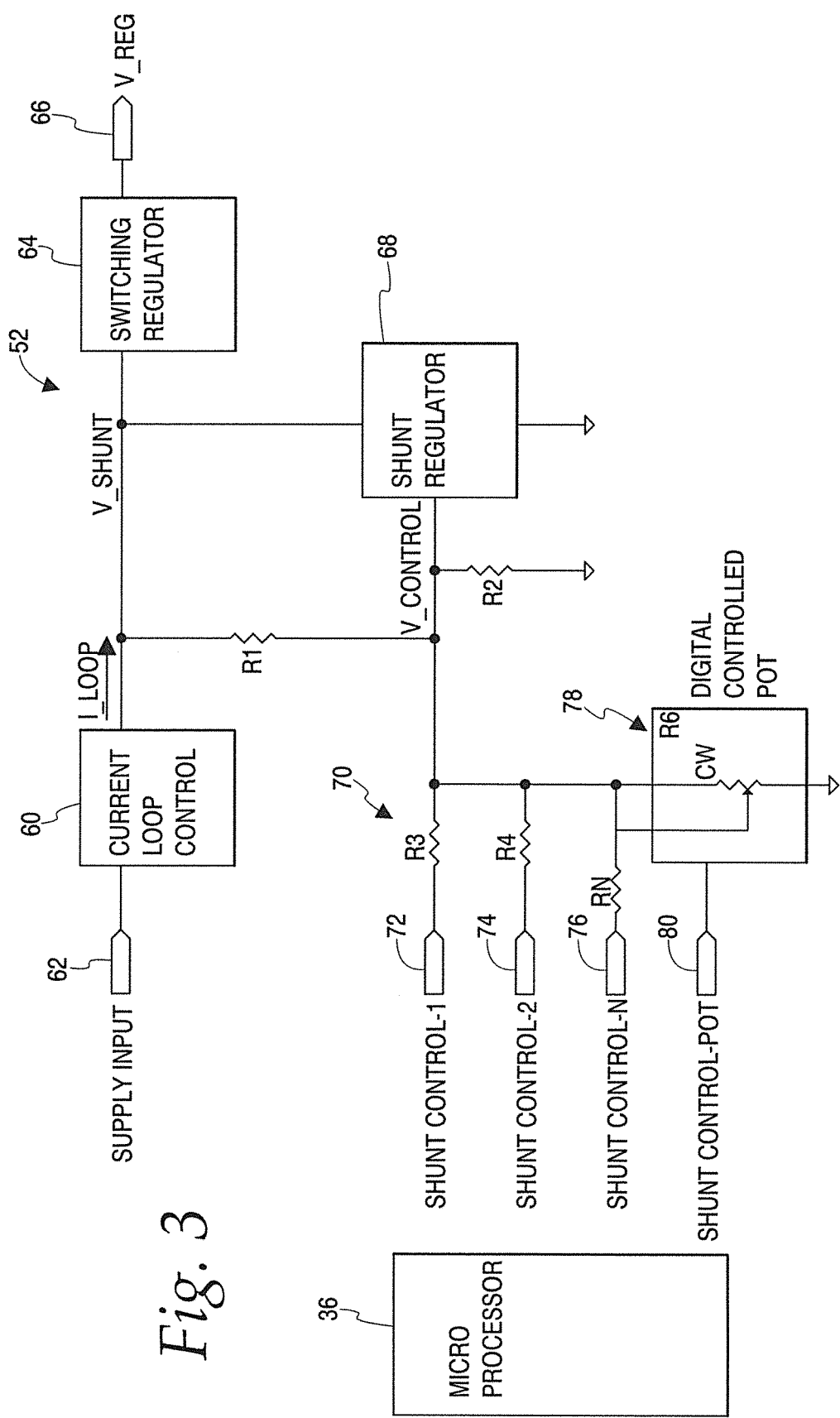
FIG. 3 is schematic of a power supply for the transmitter of FIG. 1.

Referring to FIG. 3, a generalized schematic for the power supply 52 is illustrated. A current loop control block 60 is connected to a supply input 62. The supply input 62 receives power from the external power source 50, see FIG. 2. The current loop control block 60 is part of the two-wire circuit 44 of FIG. 2 and controls loop current I_LOOP, as shown. The current loop control block 60 is connected to a switching regulator 64. The switching regulator 64 may comprise, for example, a type TPS 62120 step-down, DC-DC converter. The switching regulator 64 receives the loop current I_LOOP at a voltage designated V_SHUNT. The switching regulator 64 develops the regulated voltage V_REG at a node 66.

The total power supplied to the transmitter 20 is based on the loop current and the supply voltage to the transmitter. The transmitter 20 controls the loop current based on the process conditions as an indication of the measurement, as is conventional. The system operator provides the supply voltage from the external power source 50. The voltage V_SHUNT is controlled by the transmitter 20, as described below.

The voltage V_SHUNT is controlled by a shunt regulator 68. The shunt regulator 68 may comprise, for example, a type TLV 431 low-voltage adjustable precision shunt regulator. The shunt regulator 68 receives a reference voltage on a line labeled V_CONTROL. A resistor R1 is connected between the current loop control block 60 and the V_CONTROL line. A resistor R2 is connected between the V_CONTROL line and ground. The microprocessor 36 selectively couples resistors of a resistor divider circuit 70 to the shunt regulator V_CONTROL line to develop the reference voltage. The resistor divider circuit 70 may include plural resistors such as resistors R3, R4 . . . RN connected between respective shunt control inputs 72, 74 . . . 76 and the V_CONTROL line. The shunt control inputs 72, 74 and 76 are selectively enabled by the microprocessor 36 to control voltage supplied to the V_CONTROL line. Alternatively, a digital control potentiometer 78 may be connected to a shunt control pot input 80 controlled by the microprocessor 36 for adjusting resistor ratio.

The power supply 52 is adapted to maintain sufficient power at the output of the switching regulator 64, V_REG, for the transmitter to operate. Thus, the V_SHUNT voltage will be held at a higher level when the transmitter draws lower loop currents and likewise the V_SHUNT voltage will be reduced as the loop current, I_LOOP increases. The microprocessor 36 has the capability to choose the V_SHUNT voltage and it also controls the loop current I_LOOP in response to normal operational measurements the unit performs. Thus, the microprocessor 36 will choose the V_SHUNT voltage based on the loop current, I_LOOP, to maintain required power for the operation of the transmitter 20.

The power supply 52 acts to maintain the voltage on a control input, V_CONTROL, at a known, fixed voltage. By adjusting the resistor ratio that feeds the voltage at V_CONTROL, the power supply adjusts the voltage V_SHUNT to maintain the proper control voltage. In one embodiment, the microprocessor 36 controls V_SHUNT over 2, 4 or more discrete steps, depending on the arrangement of the resistor divider circuit 70 and the control from the microprocessor 36. Increasing the number of steps allows for better tolerance of low power supply voltage and/or increased loop resistance. In another embodiment, the digitally controlled potentiometer can be used to allow increased adjustability. In fact, both could be used.

Figure 4:
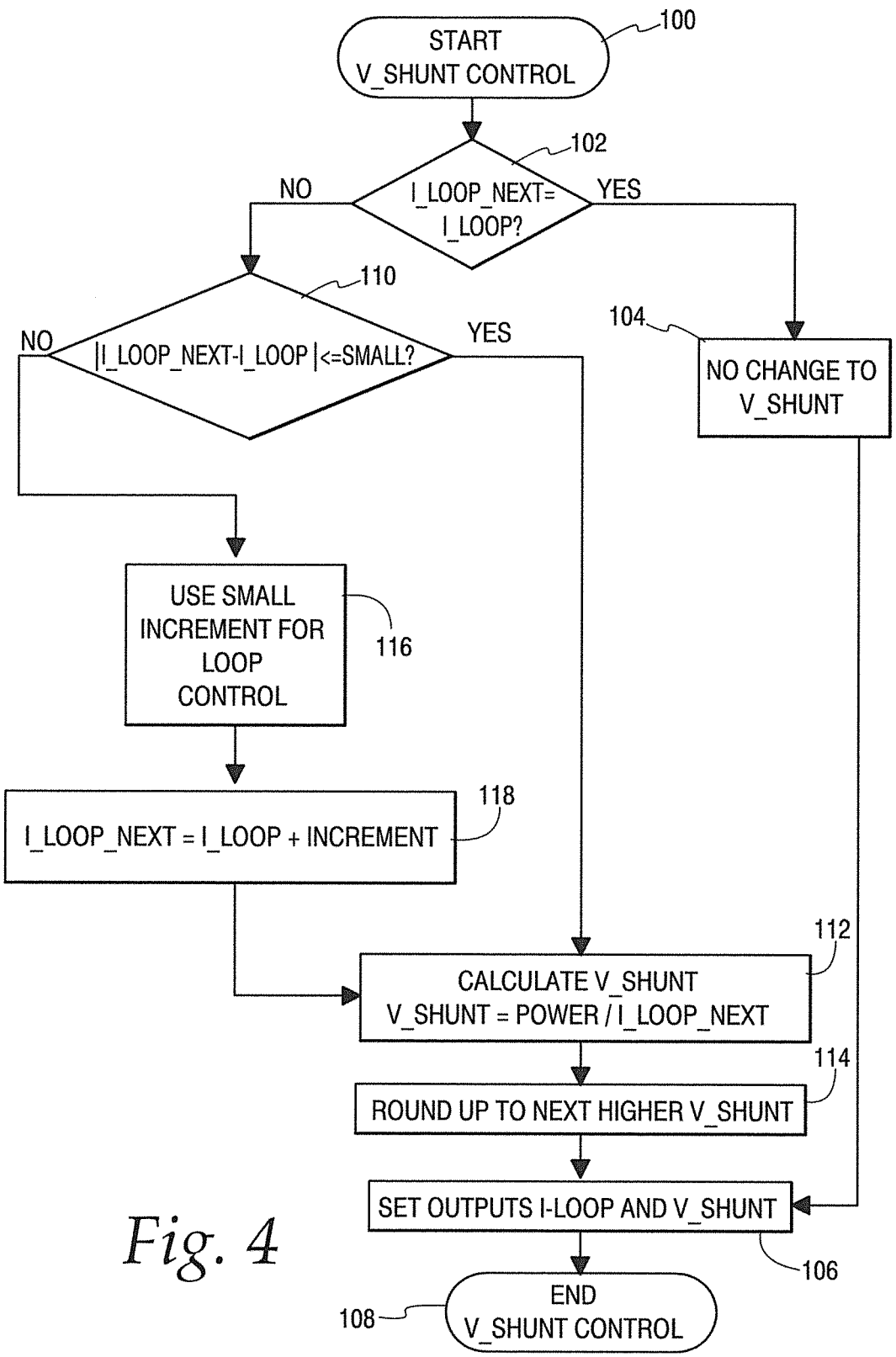
FIG. 4 is a flow diagram of a shunt voltage control routine implemented in the microprocessor of FIG. 2.

Referring to FIG. 4, a flow diagram illustrates a shunt voltage control routine implemented in the microprocessor of 36. This routine begins at a node 100. A decision block 102 determines whether or not the microprocessor 36 has determined, based on the process variable measurement, to change the loop current I_LOOP. This is determined by comparing the loop current to the next loop current. If the values are equal, then there is no change to the V_SHUNT voltage, as indicated at the block 104. The routine then sets the outputs for I_LOOP and V_SHUNT at a block 106 and the routine ends at a node 108.

If the loop current value and the next loop current value are not equal, as determined at the decision block 102, then a decision block 110 determines whether the change in loop current is less than or equal to a pre-selected "small" increment. This is done to minimize drastic changes in loop current. If so, then at a block 112, the V_SHUNT voltage is calculated as equal to power divided by the next I_LOOP current value. The calculated V_SHUNT voltage is rounded up to the next higher available V_SHUNT voltage at a block 114. This would be dependent on the discrete steps available for the divider circuit 70, see FIG. 3. The routine then advances to the block 106 to set the output for I_LOOP and V_SHUNT at the block 106.

If the change in loop current is greater than the pre-select small amount at the block 110, then a block 116 uses a small increment amount for loop control. The value I_LOOP_NEXT is set to the current I_LOOP value plus the incremental amount at a block 118. The control then advances to the block 112 to calculate the V_SHUNT voltage, as discussed above.

Thus, as described, the power supply 52 uses an adjustable shunt regulator 68 at lower loop currents to provide higher voltage from the switching regulator 64 so that more power is available for instrument operation. This maintains relative power for unit operation. This allows the instrument to tolerate lower supply voltage or increase loop resistance and to maintain a high input impedance.

Utilizing the adjustable shunt regulator to choose the optimum V_SHUNT voltage has several advantages. The V_SHUNT voltage is controlled well below the supply voltage to make the transmitter's input impedance higher which is better suited for digital communications. As long as the required power is available, the lower the V_SHUNT voltage the more tolerant the transmitter will be to the loop resistance used by the system operator. The loop resistance may include safety barrier resistance, loop monitor devices and/or wiring resistance. Control of the V_SHUNT voltage to suit the power requirements for the transmitter allows the system operator to use a lower supply voltage for a given loop resistance and still maintain operation.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A loop powered process instrument comprising:
a control system measuring a process variable and developing a measurement signal representing the process variable;
an output circuit, for connection to a remote power source using a two-wire process loop, for controlling current on the two-wire process loop in accordance with the measurement signal; and
a power supply, connected to the output circuit and the control system, for receiving power from the two-wire process loop and supplying power to the control system, wherein the power supply comprises a voltage regulator receiving loop power and developing a regulated output voltage, and an adjustable shunt regulator controlling voltage supplied to the voltage regulator.

2. The loop powered process instrument of claim 1 wherein the adjustable shunt regulator is controlled by the control system.

3. The loop powered process instrument of claim 1 wherein the adjustable shunt regulator is controlled to insure high input impedance to the instrument.

4. The loop powered process instrument of claim 1 wherein the adjustable shunt regulator is controlled to increase voltage supplied to the voltage regulator as loop current decreases and is controlled to decrease voltage supplied to the voltage regulator as loop current increases.

5. The loop powered process instrument of claim 1 wherein the control system adjusts a resistor ratio that feeds voltage supplied to the voltage regulator.

6. The loop powered process instrument of claim 5 wherein the control system adjusts the resistor ratio in discrete steps.

7. The loop powered process instrument of claim 6 wherein the control system selectively couples resistors of a resistor divider circuit to the adjustable shunt regulator.

8. The loop powered process instrument of claim 5 wherein the control system adjusts the resistor ratio using a potentiometer.

9. The loop powered process instrument of claim 1 wherein the control system adjusts the resistor ratio using a digital potentiometer.

10. The loop powered process instrument of claim 1 wherein the control system comprises a programmed processor.

11. A two-wire transmitter comprising:
a signal processing circuit measuring a process variable and developing a measurement signal representing the process variable; and
a control system including an output circuit, for connection to a remote power source using a two-wire process loop, for controlling current on the two-wire process loop in accordance with the measurement signal, and a power supply, connected to the output circuit and the control system, for receiving power from the two-wire process loop and supplying power to the control system, wherein the power supply comprises a switching regulator receiving loop power and developing a regulated output voltage, and an adjustable shunt regulator controlling voltage supplied to the switching regulator.

12. The two-wire transmitter of claim 11 wherein the adjustable shunt regulator is controlled by the control system.

13. The two-wire transmitter of claim 11 wherein the adjustable shunt regulator is controlled to insure high input impedance to the transmitter.

14. The two-wire transmitter of claim 11 wherein the adjustable shunt regulator is controlled to increase voltage supplied to the switching regulator as loop current decreases and is controlled to decrease voltage supplied to the switching regulator as loop current increases.

15. The two-wire transmitter of claim 11 wherein the control system adjusts a resistor ratio that feeds voltage supplied to the switching regulator.

16. The two-wire transmitter of claim 15 wherein the control system adjusts the resistor ratio in discrete steps.

17. The two-wire transmitter of claim 16 wherein the control system selectively couples resistors of a resistor divider circuit to the adjustable shunt regulator.

18. The two-wire transmitter of claim 15 wherein the control system adjusts the resistor ratio using a potentiometer.

19. The two-wire transmitter of claim 11 wherein the control system adjusts the resistor ratio using a digital potentiometer.

20. The two-wire transmitter of claim 11 wherein the control system comprises a programmed processor.

* * * * *